United States Patent [19]

Aoshima et al.

[11] Patent Number: 5,071,886
[45] Date of Patent: Dec. 10, 1991

[54] HEAT-SHRINKABLE, TUBULAR FOAM

[75] Inventors: Masashi Aoshima, Ibaraki; Tadashi Jinno, Mishima; Naohiro Yoshida, Osaka, all of Japan

[73] Assignee: Sumitomo Chemical Company, Limited, Osaka, Japan

[21] Appl. No.: 376,003

[22] Filed: Jul. 6, 1989

[51] Int. Cl.$^5$ .................... C08V 9/10; B29C 67/22
[52] U.S. Cl. .................... 521/89; 264/45.9; 264/54; 264/232; 264/320; 264/DIG. 5; 264/DIG. 18; 521/134; 521/140; 521/149; 521/150; 525/211; 525/222; 525/227; 525/240
[58] Field of Search ............. 521/95, 149, 150, 89, 521/134, 140; 428/318.8

[56] References Cited

U.S. PATENT DOCUMENTS

| | | | |
|---|---|---|---|
| 3,560,600 | 2/1971 | Giliniecki | 428/318.8 |
| 4,212,787 | 7/1980 | Matsuda et al. | 521/134 |
| 4,252,909 | 2/1981 | Honma et al. | 521/140 |
| 4,307,204 | 12/1981 | Vidal | 521/140 |
| 4,352,893 | 10/1982 | Johnson et al. | 521/79 |
| 4,680,317 | 7/1987 | Kuhnel et al. | 521/89 |
| 4,705,657 | 11/1987 | Poulin | |
| 4,804,733 | 2/1989 | Bataille | |
| 4,900,490 | 2/1990 | Kozma | 521/140 |

FOREIGN PATENT DOCUMENTS

| | | |
|---|---|---|
| 0253721 | 1/1988 | European Pat. Off. |
| 2237755 | 2/1975 | France |
| 49-12896 | 3/1974 | Japan |
| 58-51121 | 3/1983 | Japan |
| 1455421 | 2/1976 | United Kingdom |
| 2046254 | 11/1980 | United Kingdom |
| 88/08860 | 11/1988 | World Int. Prop. O. |

OTHER PUBLICATIONS

Chemical Abstracts, vol. 90, Part 6, Feb. 5, 1979, p. 55, Abstract No. 40029f.

Primary Examiner—Morton Foelak
Attorney, Agent, or Firm—Stevens, Davis, Miller & Mosher

[57] ABSTRACT

A heat-shrinkable, tubular foam can be produced from a composition which comprises 100 parts by weight of an ethylene-α-olefin-nonconjugated diene copolymer, 1 to 20 parts by weight of a foaming agent, 5 to 100 parts by weight of a thermoplastic resin having a Vicat softening point of 50° to 200° C., and up to 10 parts by weight of a crosslinking agent, by shaping the composition into a tube, crosslinking and foaming the tube and pressurizing the tube in the interior to inflate it. This heat-shrinkable, tubular foam is best suited for jacketing pipes, hoses, and the like.

10 Claims, 1 Drawing Sheet

HEAT-SHRINKABLE, TUBULAR FOAM

BACKGROUND OF THE INVENTION

1. Field of the Invention

The present invention relates to heat-shrinkable, tubular foams useful as thermal insulators, cushioning materials, and the like for various pipes, hoses, etc. and to a process for producing such tubular foams.

2. Description of the Related Art

Covering or jacketing various pipes, hoses, etc. with tubular EPDM foams has so far been practiced extensively for thermal insulation and protection purposes, but there has been no tubular foam having a heat shrinkability. Conventionally, covering of a pipe, hoses, or the like with a tubular foam has been carried out by; a method comprising applying a lubricant on the outside of a pipe, hoses, or the like and/or on the inside of a tubular foam and then pushing the pipe, hoses, or the like into the tubular foam; a method comprising inflating a tubular foam by applying pressure and then pushing a pipe, hoses, or the like into the inflated tubular foam; or a method comprising cutting a tubular foam lengthwise to open it and inserting and fixing a pipe, hoses, or the like in the tubular foam by winding a tape around the foam.

On the other hand, JP-A-58-51121 proposes heat-shrinkable sheets produced from an ethylene-α-olefin copolymer or an ethylene-α-olefin-polyene copolymer, wherein the α-olefin refers to the α-olefin having 4 or more carbon atoms.

Conventional methods for inserting pipes, hoses, or the like into tubular ethylene-α-olefin-nonconjugated diene copolymer foams involve various problems such as the entry of lubricant into pipes, hoses, or the like, the low efficiency of the foam pressurizing and inflating operation and of the inserting operation, and the rupture of tubular foam caused by pressure application. Accordingly, there has been desired a safety and high-efficiency method for the covering.

It is an object of the present invention to provide an improved method for covering pipes, hoses, and the like with tubular foams based on an ethylene-α-olefin-nonconjugated diene copolymer.

Other objects and advantages of the present invention will be apparent from the following description.

SUMMARY OF THE INVENTION

According to the present invention, there are provided a composition for heat-shrinkable foams which comprises 100 parts by weight of an ethylene-α-olefin-nonconjugated diene copolymer, 1 to 20 parts by weight of a foaming agent, 5 to 100 parts by weight of a thermoplastic resin having a Vicat softening point of from 50° to 200° C., and up to 10 parts by weight of a crosslinking agent, a heat-shrinkable, tubular foam produced by shaping a composition which comprises 100 parts by weight of an ethylene-α-olefin-nonconjugated diene copolymer, 1 to 20 parts by weight of a foaming agent, and 5 to 100 parts by weight of a thermoplastic resin having a Vicat softening point of from 50° to 200° C., into a tube, crosslinking and foaming the tube and pressurizing the tube in the interior to inflate it, a process for producing heat-shrinkable, tubular foams which comprises shaping the composition into a tube, crosslinking and forming the tube and pressurizing the tube in the interior to inflate it, and a method for jacketing pipes or hoses with said heat-shrinkable, tubular foams.

Figure 1:
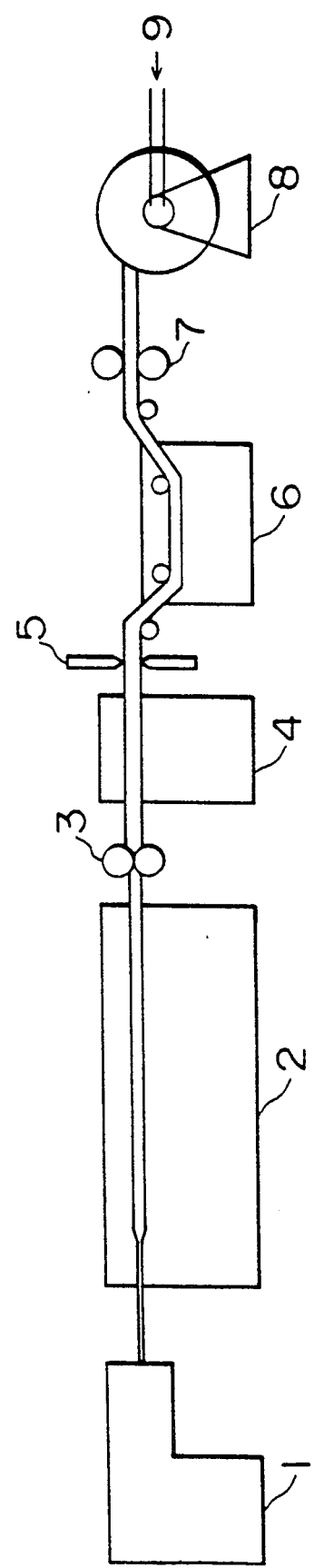
FIG. 1 shows an example of apparatuses for continuously producing heat-shrinkable tubular foams according to the present invention. In this drawing, the meanings of numerals are as follows.

1 . . . Extruder
2 . . . Continuous crosslinking heater (Hot air oven, High frequency heater, Molten salt medium or Fluidized bed medium)
3 . . . Squeeze rolls A
4 . . . Constant temperature heater (Oven or Infrared heater)
5 . . . Thickness gauge
6 . . . Cooling bath
7 . . . Squeeze rolls B
8 . . . Winder
9 . . . Compressed air.

DETAILED DESCRIPTION OF THE INVENTION

In the first place, description is given on the heat-shrinkable, tubular foam and the composition therefor. As stated above, tubular EPDM foams have already been used for the thermal insulation and protection of pipes, hoses, and the like, but there have been difficulties in covering them with those foams because those foams do not have a heat shrinkability. The heat-shrinkable, tubular foam of the present invention has a merit of facilitating the covering operation.

The weight ratio of ethylene to α-olefin in the ethylene-α-olefin-nonconjugated diene copolymer used in the present invention is not critical, but preferably it is from 85/15 to 40/60. Although the species of α-olefin is not critical, propylene and butene-1 are preferred. The species of nonconjugated diene is not critical either, but those usually used are norbornenes, cyclic dienes, and aliphatic dienes, of which preferred are 5-ethylidene-2-norbornene, dicyclopentadiene, and 1,4-hexadiene.

The thermoplastic resin which is an ingredient of the composition is used for giving a heat shrinkability to the foam. There is no particular restriction on the kind of thermoplastic resin. However, the thermoplastic resin is selected from those having a softening point of from 50° to 200° C., preferably from 75° to 100° C. Specific examples of the thermoplastic resin are polyethylene, ethylene-α-olefin copolymers such as ethylene-propylene copolymers, ethylene-vinyl acetate copolymer, ethylene-acrylate copolymers, ethylene-methacrylate copolymers, other various ethylene copolymers, polypropylene, propylene copolymers and styrene-butadiene block copolymer. Of these resins, particularly preferred are polyethylene and ethylene copolymers such as ethylene-vinyl acetate copolymer.

Such a thermoplastic resin is compounded in an amount preferably from 5 to 100 parts, more preferably from 30 to 50 parts by weight per 100 parts by weight of ethylene-α-olefin-nonconjugated diene copolymer. When the amount is less than 5 parts by weight, the heat shrinkability of the product foam is too low. When the amount exceeds 100 parts by weight, there will be raised problems such as the reduction of processability of the composition.

The kind of foaming agent used in the present invention is also not critical. Preferred foaming agents include dinitrosopentamethylenetetramine, azodicarbonamide, and p,p'-oxybis(benzenesulfonyl hydrazide). A foaming aid such as urea compounds may be used as occasion demands. The foaming agent is compounded in an amount of from 1 to 20 parts preferably from 2 to 8 parts by weight per 100 parts by weight of an ethylene-α-olefin-nonconjugated diene copolymer.

The composition of the present invention may contain one or more ingredients selected from fillers, crosslinking agents, crosslinking accelerators, activators, softeners, etc., other than the above-stated ethylene-α-olefin-nonconjugated diene copolymer, thermoplastic resin and foaming agent. Suitable fillers for use herein are of the type commonly incorporated into rubbers, such as carbon black, calcium carbonate, talc, finely-divided silic acid and clay. For the crosslinking agent, sulfur and/or a sulfur compound is used, for example, combined with or without a crosslinking accelerator. The amount of crosslinking agent incorporated into the composition is not critical. The amount is usually up to 10 parts, preferably up to 5 parts by weight per 100 parts by weight of the ethylene-α-olefin-nonconjugated diene copolymer. Suitable crosslinking accelerators include; salts or substituted dithiocarbamic acid, e.g. zinc dimethyldithiocarbamate and zinc diethyldithiocarbamate; thiuram compounds, e.g. dipentamethylthiuram tetrasulfide and tetramethylthiuram disulfide; thiazole compounds, e.g. mercaptobenzothiazole and dibenzothiazyl disulfide; and further thiourea compounds, guanidine compounds, salts of xanthogenic acid, aldehydeamines, and aldehyde ammonia compounds.

For crosslinking the composition of the present invention, quinoid compounds and organic peroxides can also be used as crosslinking agents, other than sulfur and sulfur compounds. Such quinoid compounds or organic peroxides include p-benzoquinone dioxime, p,p'-dibenzoquinone dioxime, dicumyl peroxide, 2,5-dimethyl-2,5-di(t-butylperoxy)hexane, 2,5-dimethyl-2,5-di(benzoylperoxy)hexane, and 1,1-di-t-butylperoxy-3,3,5-trimethylcyclohexane.

Specific examples of the activator include zinc white, zinc salts of fatty acids, zinc carbonate and stearic acid. Suitable softeners are various process oils, lubricating oils, paraffins, etc. which are commonly used for rubbers. Besides the above-cited ingredients, it is possible to blend an antioxidant, processing aid and other additives into the composition as occasion demands.

In the next place, description is given on the process of the present invention for producing tubular foams.

The ingredients including ethylene-α-olefin-nonconjugated diene copolymer can be kneaded according to the ordinary method with an internal mixer, e.g. a Banbury mixer or a kneader, or a roll mill. The kneading temperature in this case is usually from 50° to 210° C. However, the foaming agent, crosslinking agent, crosslinking accelerator and the like are preferably kneaded at a temperature not higher than 100° C. in order to prevent the decomposition and the scorch.

The composition obtained by kneading the ingredients is shaped into a tube through an extruder and the tube is introduced into a continuous crosslinking heater to undergo crosslinking and foaming, thereby producing an uninflated tubular foam.

Specific examples of the continuous crosslinking heater for crosslinking and foaming are hot air ovens, high frequency heaters, molten salt media, fluidized bed media and other heating units.

The obtained tube is inflated radially by pressurizing the tube in the interior with compressed air, which tube is maintained at a temperature above the softening point of the component thermoplastic resin, and is cooled immediately.

Specific examples of constant temperature heater are various ovens, infrared heaters and the like.

Further, description is given on a process in which a heat-shrinkable, tubular foam is produced by carrying out the above operation continuously.

That is, a hot, tubular foam based on the ethylene-α-olefin-nonconjugated diene copolymer which has been cross-linked and foamed in the continuous crosslinking heater is nipped with squeeze rolls to shut off the inner hole of the tube and the portion of the tube between the shut off and the end is inflated radially by introducing compressed air thereinto from the end of the tube. During this operation, the inflated portion of the tube is introduced into a cooling bath to fix the shape and size of the portion.

Then the treated tube is wound up around a tube winder provided with a pressurizing mechanism. In this manner, a heat-shrinkable, tubular foam based on the ethylene-α-olefin-nonconjugated diene copolymer can be produced continuously and efficiently.

Referring to FIG. 1, the above process is described in more detail. A tube shaped through an extruder (1) is introduced into a continuous crosslinking heater (2), where the tube is crosslinked and foamed. The resulting hot tubular foam from the continuous crosslinking bath (2) is nipped with squeeze rolls A (3) to shut off the inner hole of the tube. Then, the portion of the tube between the shut off and the end is introduced into a constant temperature heater (4) and is inflated to a definite degree by applying pressure to the tube in the interior, but this constant temperature heater (4) can be omitted when the conditions of continuous crosslinking and the environmental conditions can be maintained constant. The portion of the tube between the shut off and the end is pressurized in the interior by introducing compressed air (9) into the portion through a winder (8), thereby inflating the portion radially. The outer diameter of the inflated tube is measured by using a thickness gauge (5). The tubular foam inflated radially under definite conditions is introduced into a cooling bath (6) to fix the shape and size. The tubular foam from the cooling bath (6) is wound up around the winder (8). Squeeze rolls (7) are used for nipping the tube when the introduction of compressed air is stopped during the changeover of winding.

Since the step of giving a heat shrinkability, subsequent to the foaming, is operated continuously, the process of the present invention has such advantages that the operation efficiency and heat efficiency are high and the lengthwise dimension of the tube is hardly unchanged attributable to low degree of stretching of the tube along the length. In other words, according to the process of the present invention, the longitudinal dimension of the tube is kept almost unchanged during the processing.

The heat-shrinkable, tubular foams of the present invention, when covering various pipes and hoses, can be shrinked radially by heating at a temperature above the softening point of the component thermoplastic resin, thus forming firm jackets for heat insulation, protection and other purposes.

The present invention is illustrated in more detail with reference to the following examples, which are illustrative and not interpreted to restrict the scope of the invention.

EXAMPLES 1, 2 AND 3 AND COMPARATIVE EXAMPLE 1

Blends having compositions shown in Table 1 were kneaded in a 1.7-1 Banbury mixer and then over a 10-inch roll mill to obtain a composition. Each kneaded composition was formed into a tubular shape through a 45-mm extruder and an annular die of 10-mm outer diameter and 5-mm inner diameter. Each extruded composition was introduced into a continuous crosslinking heater, wherein the composition was crosslinked and foamed at 200° C.

The specific gravities of the obtained foams are shown in Table 2.

TABLE 1

| Ingredient | Example 1 | Example 2 | Example 3 | Comparative Example 1 |
|---|---|---|---|---|
| ESPRENE 505[1] | 100 | 100 | 100 | 100 |
| Zinc oxide | 5 | 5 | 5 | 5 |
| Stearic acid | 1 | 1 | 1 | 1 |
| SEAST SO[2] | 50 | 50 | 50 | 50 |
| Talc | 100 | 100 | 100 | 100 |
| Paraffinic oil | 50 | 50 | 50 | 50 |
| SUMIKATHENE G806[3] | 40 | | | |
| SUMIKATHENE F221-1[3'] | | 40 | | |
| EVATATE H2011[4] | | | 40 | |
| CELMIC A[5] | 5 | 5 | 5 | 5 |
| CELTON NP[6] | 5 | 5 | 5 | 5 |
| Zinc dimethyldithiocarbamate | 1 | 1 | 1 | 1 |
| Zinc diethyldithiocarbamate | 2 | 2 | 2 | 2 |
| Mercaptobenzothiazole | 1 | 1 | 1 | 1 |

TABLE 1-continued

| Ingredient | Example 1 | Example 2 | Example 3 | Comparative Example 1 |
|---|---|---|---|---|
| Sulfur | 1 | 1 | 1 | 1 |

Notes,
[1]ESPRENE 505: EPDM (ethylene-propylene-nonconjugated diene copolymer rubber) made by Sumitomo Chemical Co., Ltd.
[2]SEAST SO: Carbon black made by Tokai Carbon Co., Ltd.
[3]SUMIKATHENE G808: Low density polyethylene (Vicat softening point: 79° C.) made by Sumitomo Chemical Co., Ltd.
[3']SUMIKATHENE F221-1: Low density polyethylene (Vicat softening point: 97° C.) made by Sumitomo Chemical Co., Ltd.
[4]EVATATE H2011: Ethylene-vinyl acetate copolymer (Vicat softening point: 82° C.) made by Sumitomo Chemical Co., Ltd.
[5]CELMIC A:
Foaming agent: Dinitrosopentamethylenetetramine
Chemical formula: $C_5H_{10}N_6O_2$
Structural formula:

$$\begin{array}{c} H_2C-N-CH_2 \\ | \quad | \quad | \\ ON-N \quad CH_2 \quad N-NO \\ | \quad | \quad | \\ H_2C-N-CH_2 \end{array}$$

Maker: Sankyo Kasei Co., Ltd.
[6]CELTON NP: Urea and its derivative
Maker: Sankyo Kasei Co., Ltd.

Each tubular foam obtained was sealed at one end thereof, heated to and kept at 100° C., and internally pressurized by introducing compressed air through the other end, thus being infalted to 1.5 times the original diameter, and was cooled immediately by dipping in cold water to fix the size of tubular foam.

Table 2 also shows the inner diameter of each inflated tubular foam after removal of pressure and the degree of inflation of each foam, that is, the inner diameter ratio of inflated foam to uninflated foam. The foam of Comparative Example 1 showed a low degree of inflation, that is, the inner diameter of this foam, containing no thermoplastic resin was practically equal to that of the original foam. In contrast to this, the foams of Examples 1, 2 and 3 exhibited high degrees of inflation and after removal of pressure, they retained nearly the same size as they had immediately after the inflation thereof.

After the obtained tubular foams had been heated with hot air of 100° C., the inner diameter of each foam was measured and the shrinkage (%) of the inner diameter of each foam was determined. Results of these evaluations are also shown in Table 2. Tubular foams of Examples 1, 2 and 3 exhibited a good heat shrinkability, being shrinked by heating to sizes nearly equal to the original.

TABLE 2

| | Example 1 | Example 2 | Example 3 | Comparative Example 1 |
|---|---|---|---|---|
| Specific gravity of foam before pressure application | 0.27 | 0.25 | 0.26 | 0.28 |
| Inner diameter (mm) of foam before pressure application | 12.2 | 12.5 | 12.8 | 12.0 |
| Inner diameter (mm) of foam after pressure removal | 18.1 | 18.6 | 18.4 | 12.1 |
| Degree of inflation (%) (percentage of increase in inner diameter) | 48 | 49 | 50 | 1 |
| Inner diameter (mm) of foam after shrinking by heating | 12.3 | 12.4 | 12.5 | 11.9 |
| Heat shrinkage (%) of inner diameter of foam | 32 | 33 | 32 | 2 |

What is claimed is:

1. A heat-shrinkable, tubular foam produced by the steps of:

(i) extruding a composition comprising 100 parts by weight of an ethylene-alpha-olefin-nonconjugated diene copolymer; 1 to 20 parts by weight of a foaming agent and 5 to 100 parts by weight of at least one thermoplastic resin having a Vicat softening point of from 50° to 200° C. selected from the group consisting of polyethylene, ethylene-alpha-olefin copolymers, ethylene-vinyl acetate copolymer, ethylene-acrylate copolymer, ethylene-methacrylate copolymer, polypropylene, propylene copolymers and styrene-butadiene block copolymer to obtain a tube, (ii) heating the tube so as to crosslink and foam the tube, (iii) pressurizing the crosslinked, foamed tube in the interior to radially inflate it while keeping the crosslinked, foamed tube at a temperature not lower than the melting point of the thermoplastic resin, to obtain an inflated tube, and (iv) immediately cooling the inflated tube, the steps being carried out continuously.

2. A heat-shrinkable, tubular foam according to claim 1, wherein the $\alpha$-olefin in the ethylene-$\alpha$-olefin-nonconjugated diene copolymer is propylene or butene-1.

3. A heat-shrinkable, tubular foam according to claim 1, wherein the weight ratio of ethylene to $\alpha$-olefin in the ethylene-$\alpha$-olefin-nonconjugated diene copolymer is from 85/15 to 40/60.

4. A heat-shrinkable, tubular foam according to claim 1, wherein the nonconjugated diene in the ethylene-$\alpha$-olefin-nonconjugated diene copolymer is 5-ethylidene-2-norbornene, dicyclopentadiene or 1,4-hexadiene.

5. A heat-shrinkable, tubular foam according to claim 1, wherein the thermoplastic resin is polyethylene or ethylene-vinyl acetate copolymer.

6. A heat-shrinkable, tubular foam according to claim 1, wherein the Vicat softening point of the thermoplastic resin is from 75° to 100° C.

7. A heat-shrinkable, tubular foam according to claim 1, wherein the foaming agent is dinitrosopentamethylenetetramine, azodicarbonamide or p,p'-oxybis(benzenesulfonyl hydrazide).

8. A method for jacketing pipes or hoses with heat-shrinkable, tubular foams according to claim 1.

9. A heat-shrinkable, tubular foam according to claim 1, which has 30% or more heat shrinkage of the inner diameter when heated with hot air of 100° C.

10. A heat-shrinkable, tubular foam of claim 1, wherein the thermoplastic resin is selected from the group consisting of ethylene-propylene copolymer, polyethylene and ethylene-vinyl-acetate copolymer.

* * * * *